United States Patent
Ku et al.

(10) Patent No.: US 10,633,024 B2
(45) Date of Patent: Apr. 28, 2020

(54) VEHICLE LATERAL CONTROL SYSTEM HAVING LANE MODEL WITH MODULATION WEIGHTING AND CONTROL METHOD THEREOF

(71) Applicant: Automotive Research & Testing Center, Changhua County (TW)

(72) Inventors: Kun-Lung Ku, Changhua County (TW); Jin-Yan Hsu, Changhua County (TW); Hung-Pang Lin, Changhua County (TW); Tong-Kai Jhang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 240 days.

(21) Appl. No.: 15/856,035

(22) Filed: Dec. 27, 2017

(65) Prior Publication Data

US 2019/0193785 A1  Jun. 27, 2019

(51) Int. Cl.
| | |
|---|---|
| *B62D 15/02* | (2006.01) |
| *G06K 9/00* | (2006.01) |
| *B60R 16/023* | (2006.01) |
| *B60W 30/12* | (2020.01) |
| *H04N 7/18* | (2006.01) |

(52) U.S. Cl.
CPC ........ *B62D 15/025* (2013.01); *B60R 16/0231* (2013.01); *B60W 30/12* (2013.01); *G06K 9/00798* (2013.01); *H04N 7/183* (2013.01)

(58) Field of Classification Search
CPC .. B62D 15/025; B60R 16/0231; B60W 30/12; G06K 9/00798; H04N 7/183
See application file for complete search history.

(56) References Cited

U.S. PATENT DOCUMENTS

| | | | |
|---|---|---|---|
| 8,462,988 B2 * | 6/2013 | Boon | G06K 9/00798 |
| | | | 382/104 |
| 9,180,908 B2 | 11/2015 | Van Dan Elzen et al. | |
| 9,283,967 B2 | 3/2016 | Lee | |
| 9,550,526 B2 | 1/2017 | You et al. | |
| 10,239,451 B1 * | 3/2019 | Adam | B60Q 9/008 |

(Continued)

FOREIGN PATENT DOCUMENTS

| | | |
|---|---|---|
| TW | I455074 B | 10/2014 |
| TW | I564193 B | 1/2017 |

*Primary Examiner* — Calvin Cheung
(74) *Attorney, Agent, or Firm* — CKC & Partners Co., LLC

(57) ABSTRACT

A vehicle lateral control system having a lane model with modulation weighting for controlling a vehicle includes a camera, an image processing device, a controller and a steering device. The camera is configured to capture a front image of the vehicle to generate a front image dataset. The front image dataset is analyzed by the image processing device to obtain a plurality of lane markers, and the image processing device establishes a lane fitting curve according to the lane markers and a target weighting. The controller has a plurality of vehicle dynamic parameters and a target distance. The target weighting is changeable according to the target distance. The controller generates a steering control weighting according to the lane fitting curve and the vehicle dynamic parameters. The steering device is configured to control a turning direction of the vehicle according to the steering control weighting.

15 Claims, 9 Drawing Sheets

(56) References Cited

U.S. PATENT DOCUMENTS

| | | | |
|---|---|---|---|
| 2002/0095246 A1* | 7/2002 | Kawazoe | B62D 15/025 |
| | | | 701/1 |
| 2003/0025597 A1* | 2/2003 | Schofield | B60Q 1/346 |
| | | | 340/435 |
| 2006/0030987 A1* | 2/2006 | Akita | B62D 15/025 |
| | | | 701/41 |
| 2012/0216208 A1* | 8/2012 | Takemura | G08G 1/09623 |
| | | | 718/103 |
| 2013/0231830 A1* | 9/2013 | Van Dan Elzen | B62D 6/00 |
| | | | 701/42 |
| 2013/0274985 A1* | 10/2013 | Lee | B60W 10/20 |
| | | | 701/23 |
| 2015/0032369 A1* | 1/2015 | Schmidt | B60Q 9/00 |
| | | | 701/467 |
| 2015/0344032 A1* | 12/2015 | Oh | B60W 30/16 |
| | | | 701/37 |
| 2016/0075334 A1* | 3/2016 | Terazawa | B62D 15/025 |
| | | | 701/41 |
| 2016/0334796 A1* | 11/2016 | Inoue | G05D 1/0278 |
| 2017/0029025 A1 | 2/2017 | Kim | |
| 2017/0253182 A1* | 9/2017 | Aoki | B60K 35/00 |
| 2018/0154938 A1* | 6/2018 | Kataoka | B60W 30/12 |
| 2018/0229768 A1* | 8/2018 | Ma | B62D 15/025 |

\* cited by examiner

VEHICLE LATERAL CONTROL SYSTEM HAVING LANE MODEL WITH MODULATION WEIGHTING AND CONTROL METHOD THEREOF

BACKGROUND

Technical Field

The present disclosure relates to a vehicle lateral control system and a control method thereof. More particularly, the present disclosure relates to a vehicle lateral control system having a lane model with modulation weighting for controlling a vehicle and a control method thereof.

Description of Related Art

A lane keeping control system is a system configured to sense a lane by using image information obtained from a camera sensor and control a vehicle based on a lane sensing result so as to prevent lane deviation of a vehicle. The lane keeping control system performs control so as to prevent lane deviation of a vehicle while driving by generating an auxiliary steering torque to a steering control apparatus and controls the steering. Among the lane keeping control systems, a vehicle lateral control system configured to control lane keeping by controlling steering of the vehicle so as to keep a center of a lane has been developed.

A conventional vehicle lateral control system in the related art sets a reference keeping position which a vehicle has to keep by reflecting a driving tendency of a driver, so that the vehicle lateral control system is considerably affected by a condition of the lane or the driver. When the vehicle leaves the reference keeping position, the vehicle lateral control system rapidly performs a sudden steering control force so as to keep the vehicle within the reference keeping position, thereby causing the driver to feel a sense of difference in control of the vehicle and an uncomfortable feeling. In addition, the conventional vehicle lateral control system utilizes a lane fitting curve with same weighting of the lane model to calculate a lateral offset distance so as to easily generate an inaccurate lateral offset distance. In addition, the conventional vehicle lateral control system easily generates the sudden steering control force and the uncomfortable feeling of the driver during a switching between the driver and the system. Therefore, a vehicle lateral control system and a method thereof having the lane model with modulation weighting for controlling the vehicle are commercially desirable.

SUMMARY

According to one aspect of the present disclosure, a vehicle lateral control system having a lane model with modulation weighting for controlling a vehicle includes a camera, an image processing device, a controller and a steering device. The camera is disposed on the vehicle and faced toward a front of the vehicle. The camera is configured to capture a front image of the vehicle to generate a front image dataset. The image processing device is signally connected to the camera and receives the front image dataset. The front image dataset is analyzed by the image processing device to obtain a plurality of lane markers, and the image processing device establishes a lane fitting curve according to the lane markers and a target weighting. The controller is signally connected to the image processing device and has a plurality of vehicle dynamic parameters and a target distance. The target weighting is changeable according to the target distance, and the controller generates a steering control weighting according to the lane fitting curve and the vehicle dynamic parameters. The steering device is signally connected to the controller and disposed on the vehicle. The steering device is configured to control a turning direction of the vehicle according to the steering control weighting.

According to another aspect of the present disclosure, a vehicle lateral control method having a lane model with modulation weighting for controlling a vehicle provides an image capturing step, an image processing step, a control weighting generating step and a steering control step. The image capturing step is for capturing a front image of the vehicle to generate a front image dataset by a camera. The image processing step is for receiving the front image dataset and analyzing the front image dataset by the image processing device to obtain a plurality of lane markers. The image processing device establishes a lane fitting curve according to the lane markers and a target weighting. The control weighting generating step is for generating a steering control weighting according to the lane fitting curve and a plurality of vehicle dynamic parameters by a controller. The controller has the vehicle dynamic parameters and a target distance, and the target weighting is changeable according to the target distance. The steering control step is for controlling a turning direction of the vehicle according to the steering control weighting by a steering device.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
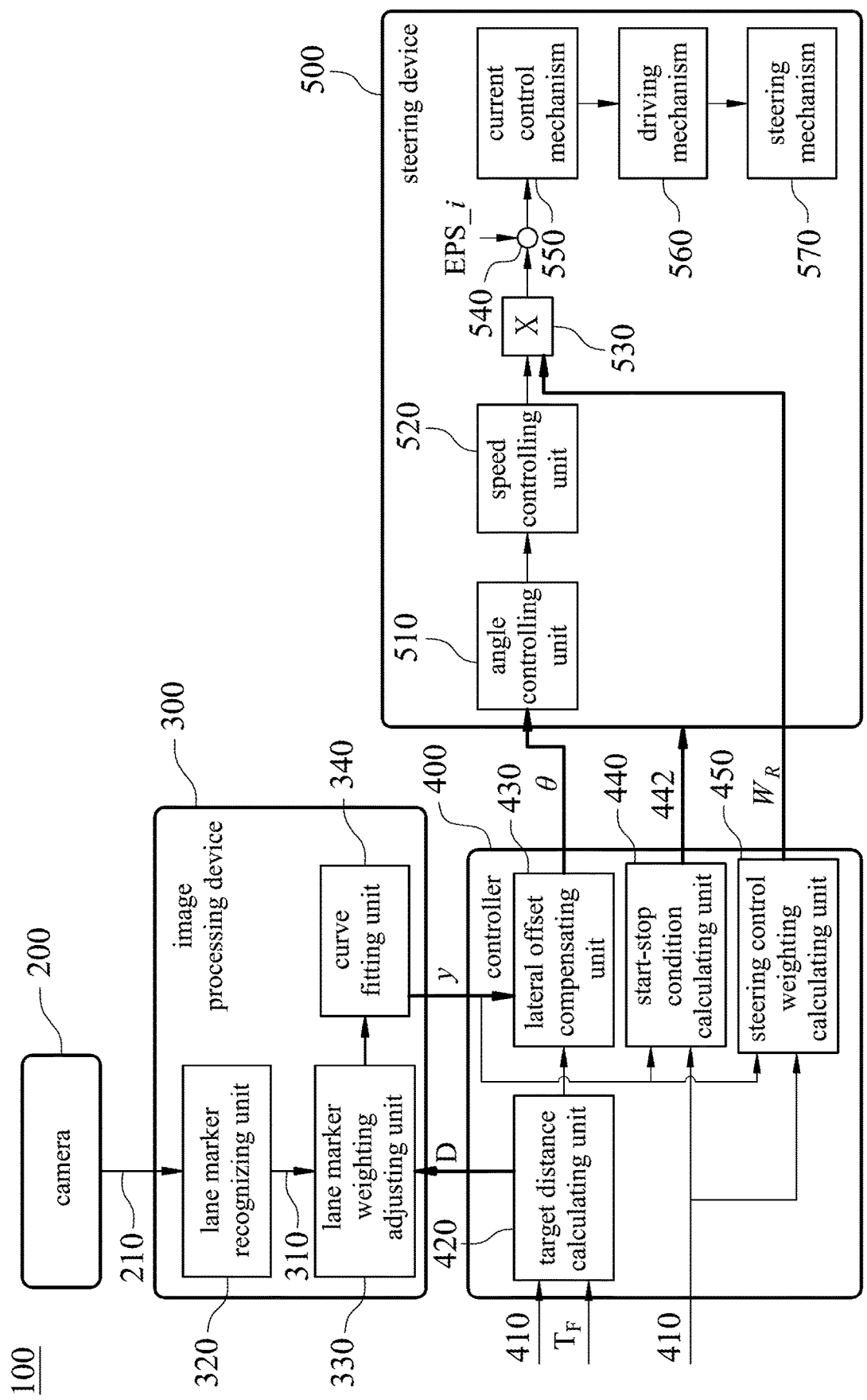
FIG. 1 shows a block diagram of a vehicle lateral control system having a lane model with modulation weighting for controlling a vehicle according to one embodiment of the present disclosure.
Figure 2:
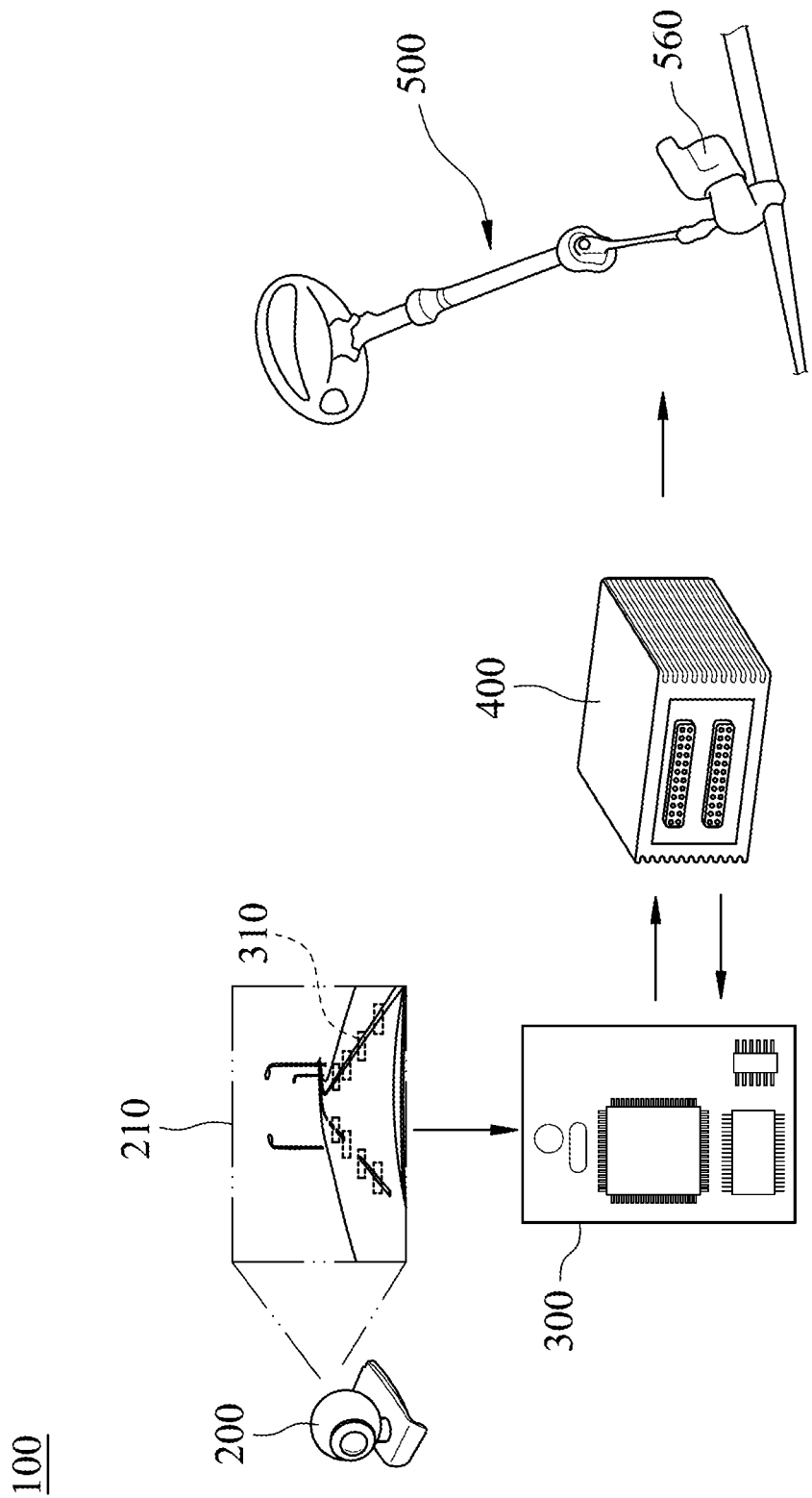
FIG. 2 shows a schematic view of the vehicle lateral control system having the lane model with modulation weighting for controlling the vehicle of FIG. 1.
Figure 3:
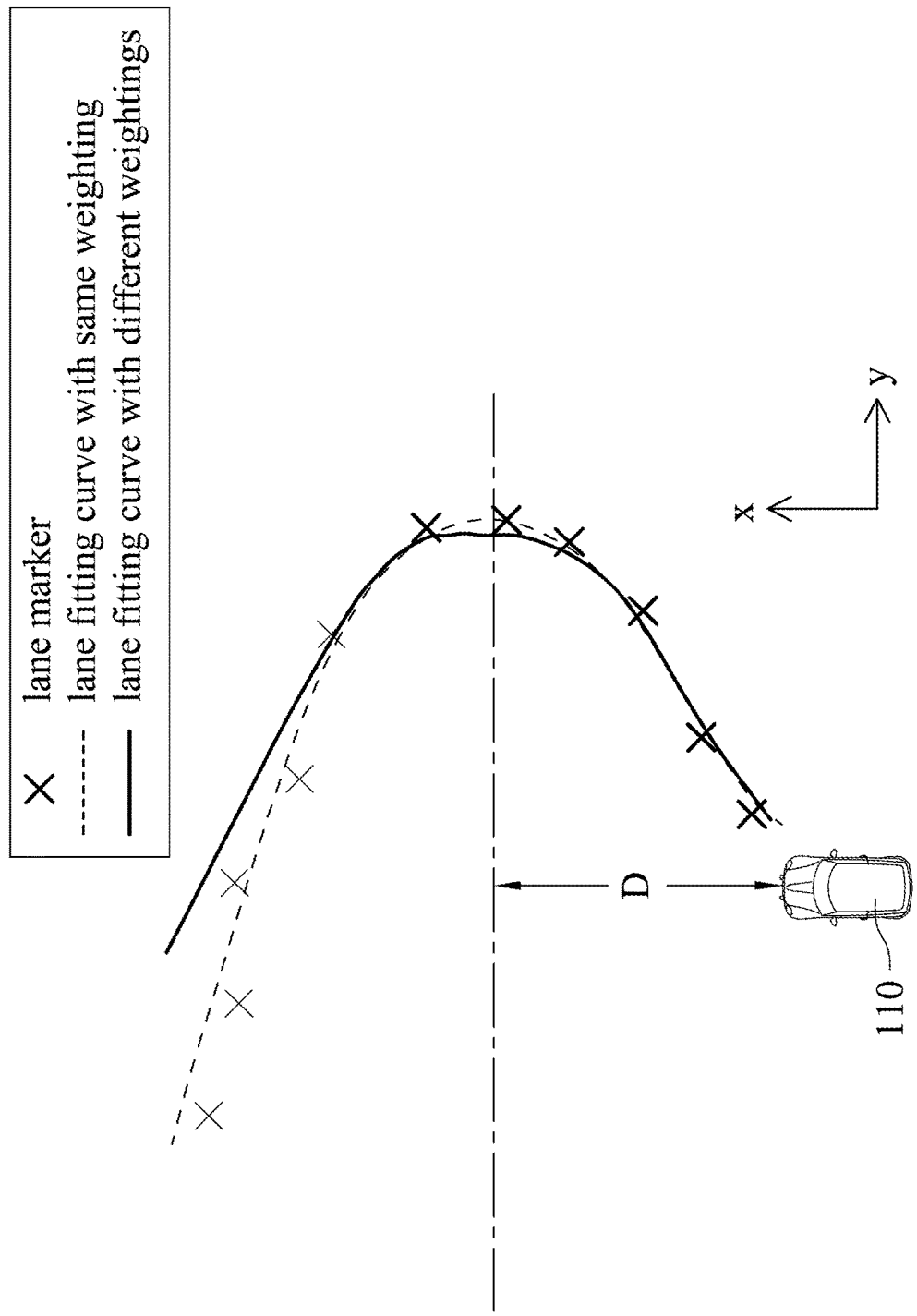
FIG. 3 shows a schematic view of a target distance having different lane models according to one embodiment of the present disclosure.
Figure 4:
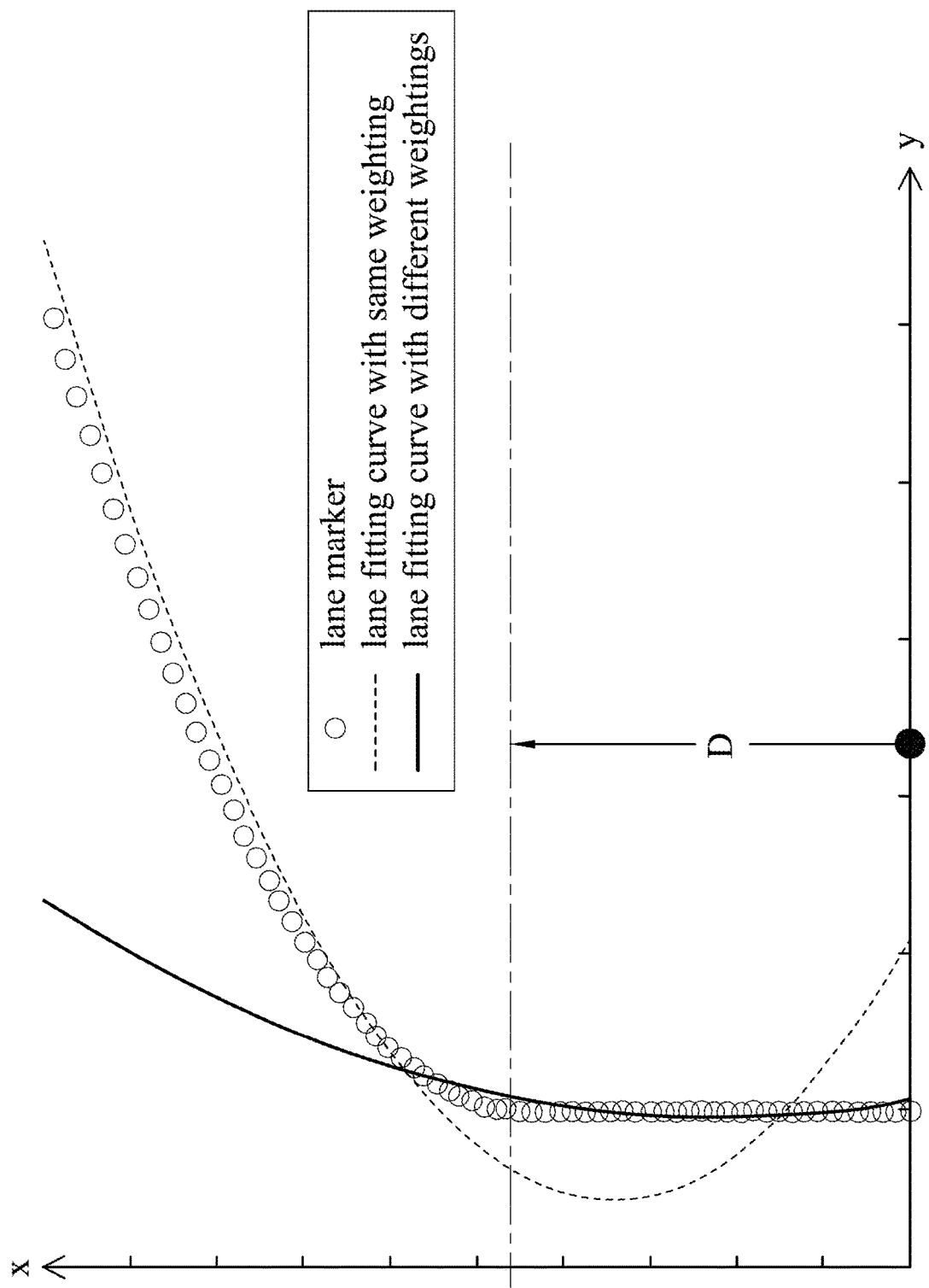
FIG. 4 shows a schematic view of a target distance having different lane models according to another embodiment of the present disclosure.
Figure 5A:
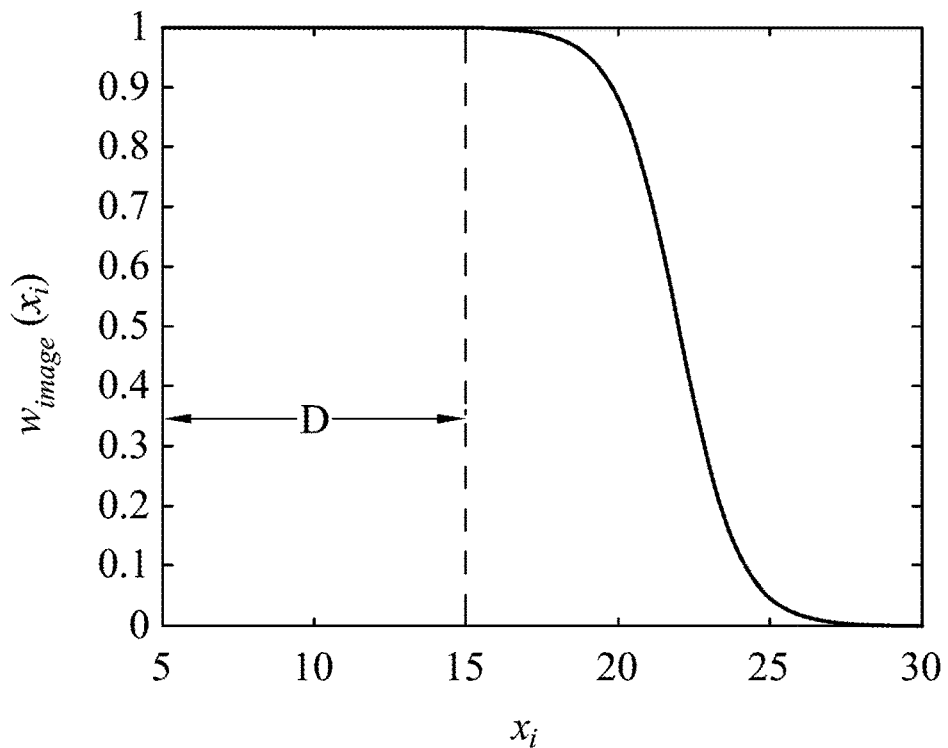
FIG. 5A shows a schematic view of a target weighting according to a first embodiment of the present disclosure.
Figure 5B:
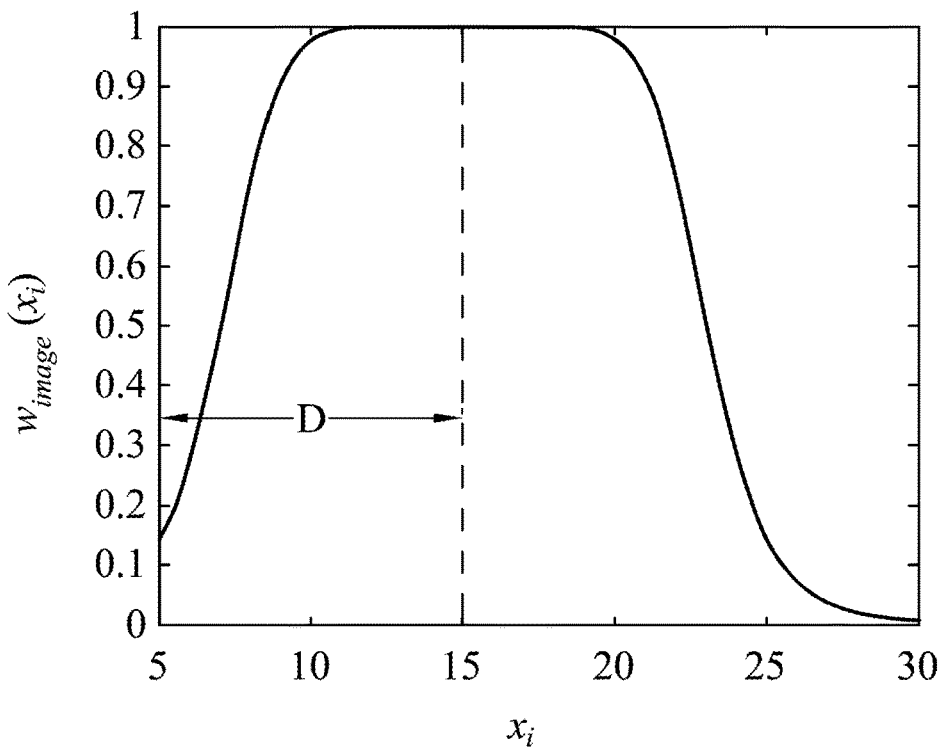
FIG. 5B shows a schematic view of a target weighting according to a second embodiment of the present disclosure.
Figure 6:
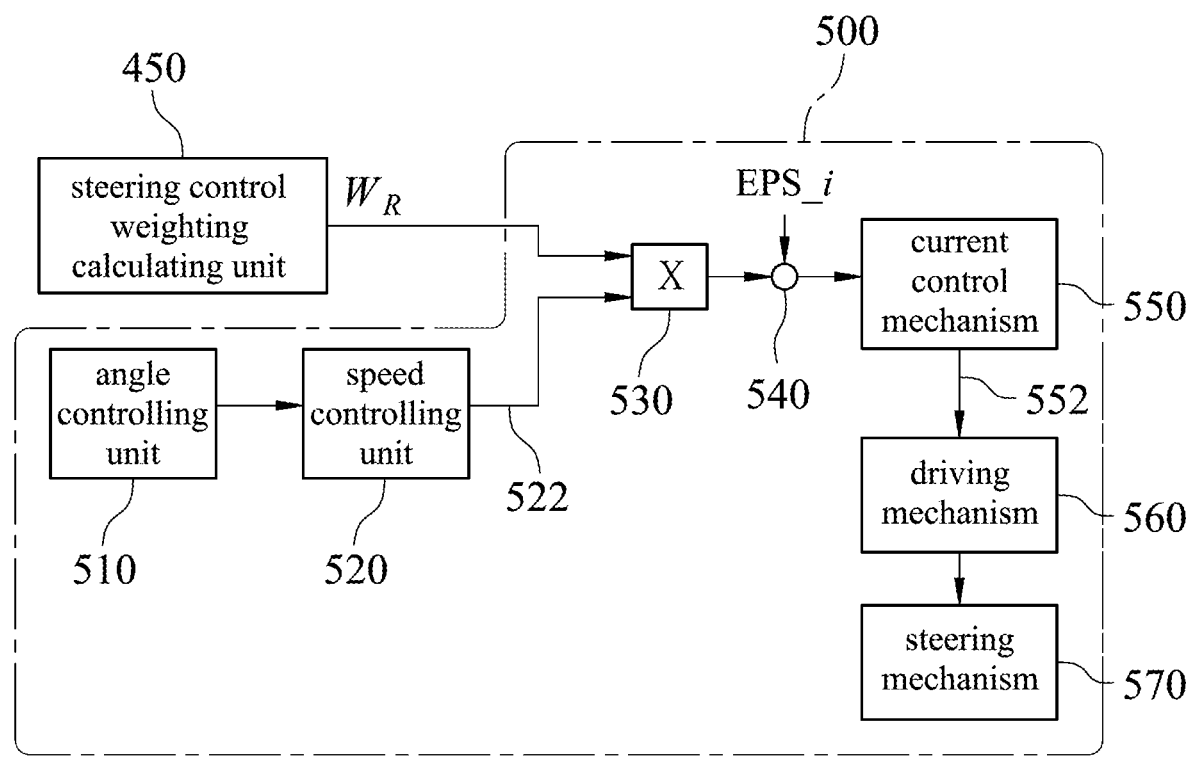
FIG. 6 shows a block diagram of a steering device of FIG. 1.
Figure 7:
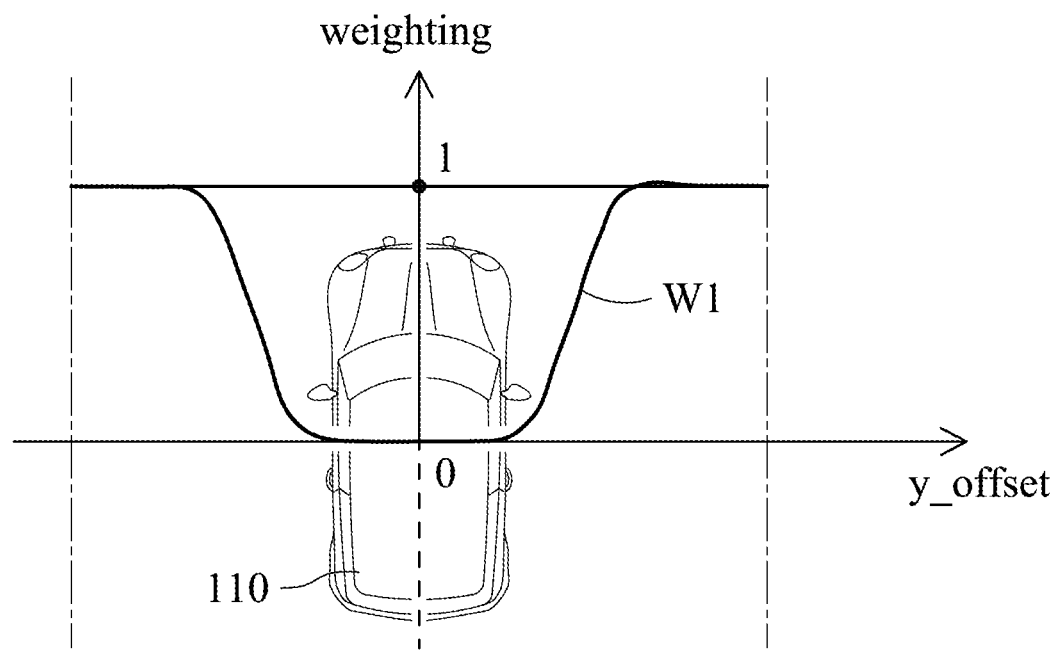
FIG. 7 shows a schematic view of a lateral offset weighting value of the steering control weighting of FIG. 6.
Figure 8:
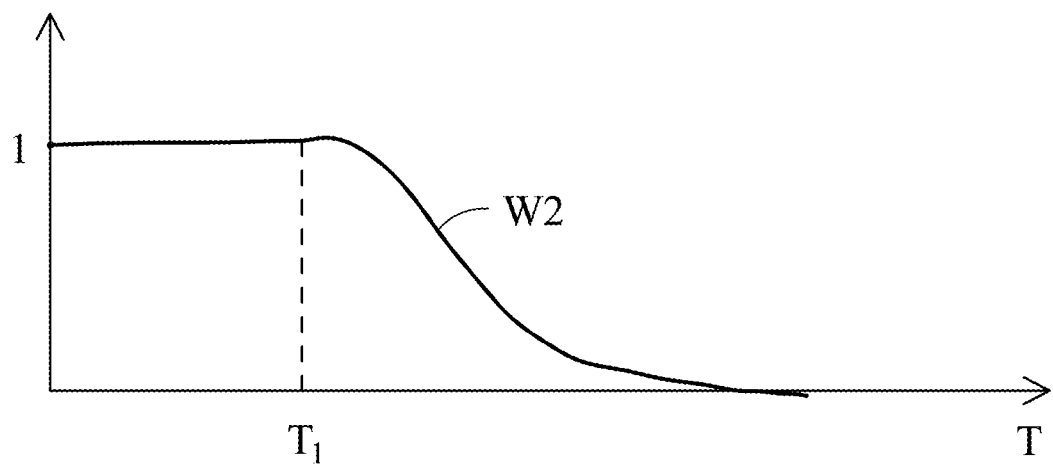
FIG. 8 shows a schematic view of an estimated lane crossing weighting value of the steering control weighting of FIG. 6.

FIG. 1 shows a block diagram of a vehicle lateral control system 100 having a lane model with modulation weighting for controlling a vehicle 110 according to one embodiment of the present disclosure; FIG. 2 shows a schematic view of the vehicle lateral control system 100 having the lane model with modulation weighting for controlling the vehicle 110 of FIG. 1; FIG. 3 shows a schematic view of a target distance D having different lane models according to one embodiment of the present disclosure; FIG. 4 shows a schematic view of the target distance D having different lane models according to another embodiment of the present disclosure; FIG. 5A shows a schematic view of a target weighting $w_{image}(x_i)$ according to a first embodiment of the present disclosure; FIG. 5B shows a schematic view of a target weighting $w_{image}(x_i)$ according to a second embodiment of the present disclosure; FIG. 6 shows a block diagram of a steering device 500 of FIG. 1; FIG. 7 shows a schematic view of a lateral offset weighting value W1 of a steering control weighting $W_R$ of FIG. 6; and FIG. 8 shows a schematic view of an estimated lane crossing weighting value W2 of the steering control weighting $W_R$ of FIG. 6. In FIGS. 1-8, the vehicle lateral control system 100 having the lane model with modulation weighting for controlling the vehicle 110 includes a camera 200, an image processing device 300, a controller 400 and a steering device 500.

The camera 200 is disposed on the vehicle 110 and faced toward a front of the vehicle 110. The camera 200 is configured to capture a front image of the vehicle 100 to generate a front image dataset 210. The front image dataset 210 may be a two-dimensional image dataset or a three-dimensional image dataset according to the function of the camera 200. The front image dataset 210 is transmitted from the camera 200 to the image processing device 300 for image processing.

The image processing device 300 is signally connected to the camera 200 and receives the front image dataset 210. The front image dataset 210 is analyzed by the image processing device 300 to obtain a plurality of lane markers 310, and the image processing device 300 establishes a lane fitting curve y according to the lane markers 310 and a target weighting $w_{image}(x_i)$. In detail, the image processing device 300 includes a lane marker recognizing unit 320, a lane marker weighting adjusting unit 330 and a curve fitting unit 340. The lane marker recognizing unit 320 is electrically connected to the camera 200 and receives the front image dataset 210. The front image dataset 210 is analyzed by the lane marker recognizing unit 320 to obtain a plurality of lane markers 310. The lane markers 310 are corresponding to two lane lines in the front image dataset 210 and are used to establish the lane model of the vehicle 110. The lane markers 310 are represented by coordinate data $(x_i, y_i)$, wherein $x_i$ and $y_i$ represent the coordinates of the lane lines corresponding to an X-axis and a Y-axis, respectively. The parameter i represents a positive integer from 1 to n. In addition, the lane marker weighting adjusting unit 330 is signally connected to the lane marker recognizing unit 320 and the controller 400. The lane marker weighting adjusting unit 330 receives the coordinate data $(x_i, y_i)$ of the lane markers 310 from the lane marker recognizing unit 320 and the target distance D from the controller 400. The coordinate data $(x_i, y_i)$ of the lane markers 310 and the target distance D are calculated by the lane marker weighting adjusting unit 330 to generate the target weighting $w_{image}(x_i)$. The target weighting $w_{image}(x_i)$ represents the weighting of the lane model, i.e., the weighting of the lane markers 310. The target weighting $w_{image}(x_i)$ is changeable according to the target distance D. For example, the target weighting $w_{image}(x_i)$ according to a first embodiment of the present disclosure can be described as follows:

$$w_{image}(x_i) = 1 - \frac{1}{1 + e^{-a(x_i - b)}}, \quad (1)$$

wherein the parameters a and b are predetermined parameters which can be adjustable. The parameter a is used to adjust a slope of a waveform of the target weighting $w_{image}(x_i)$. The parameter b represents the value of $x_i$ when the target weighting $w_{image}(x_i)$ is equal to 0.5, and the parameter b is greater than the target distance D. In one embodiment, the target distance D may be equal to 15 m, and the parameters a and b are equal to 1 and 22, respectively, as shown in FIG. 5A. In FIG. 5A, the target weighting $w_{image}(x_i)$ within the target distance D is greater than the target weighting $w_{image}(x_i)$ beyond the target distance D. In addition, the target weighting $w_{image}(x_i)$ according to a second embodiment of the present disclosure can be described as follows:

$$w_{image}(x_i) = \frac{1}{1 + \left|\frac{x_i - D}{c}\right|^{2d}}, \quad (2)$$

wherein the parameters c and d are predetermined parameters which can be adjustable. The parameter c is used to adjust a width of the waveform of the target weighting $w_{image}(x_i)$. The parameter d is used to adjust the slope of the waveform of the target weighting $w_{image}(x_i)$. In one embodiment, the target distance D may be equal to 15 m, and the parameters c and d are equal to 8 and 4, respectively, as shown in FIG. 5B. Moreover, the curve fitting unit 340 is signally connected to the lane marker weighting adjusting unit 330 and receives the coordinate data $(x_i, y_i)$ of the lane markers 310 and the target weighting $w_{image}(x_i)$. The curve fitting unit 340 multiplies the coordinate data $(x_i, y_i)$ of each of the lane markers 310 with the target weighting $w_{image}(x_i)$, and then uses a weighted least squares method to generate the lane fitting curve y. The process of calculating the lane fitting curve y can be described as follows:

$$\begin{bmatrix} y_1 \\ y_2 \\ \vdots \\ y_n \end{bmatrix} = \begin{bmatrix} 1 & x_1 & x_1^2 \\ 1 & x_2 & x_2^2 \\ \vdots & \vdots & \vdots \\ 1 & x_n & x_n^2 \end{bmatrix} \begin{bmatrix} p \\ q \\ r \end{bmatrix}, \quad (3)$$

$$W = \begin{bmatrix} w_{image}(x_1) & 0 & 0 & 0 & 0 \\ 0 & w_{image}(x_2) & 0 & 0 & 0 \\ \vdots & \vdots & \vdots & \vdots & \vdots \\ 0 & 0 & 0 & 0 & w_{image}(x_n) \end{bmatrix}, \quad (4)$$

$$[pqr]^T = [F^T WF]^{-1} F^T WY, \quad (5)$$

$$F = \begin{bmatrix} 1 & x_1 & x_1^2 \\ 1 & x_2 & x_2^2 \\ \vdots & \vdots & \vdots \\ 1 & x_n & x_n^2 \end{bmatrix}, \quad Y = \begin{bmatrix} y_1 \\ y_2 \\ \vdots \\ y_n \end{bmatrix}. \quad (6)$$

Wherein the parameters p, q and r can be obtained by performing the weighted least squares method and the above-mentioned equations (3)-(6). Finally, the curve fitting unit 340 can generate the lane fitting curve y which is equal to $p+qx+rx^2$. Certainly, the lane fitting curve y is not limited to a second order equation, and can be a third or higher order equation. Therefore, the image processing device 300 of the present disclosure may be associated with the controller 400 to adjust the weighting of the lane markers 310 within the target distance D, thereby precisely performing the computation of the lane model. In addition, the effectiveness of the vehicle lateral control system 100 and the accuracy of the lane fitting curve y are greatly enhanced.

The controller 400 is signally connected to the image processing device 300 and has a plurality of vehicle dynamic parameters 410 and the target distance D. The target weighting $w_{image}(x_i)$ is changeable according to the target distance D, and the controller 400 generates the steering control weighting $W_R$ according to the lane fitting curve y and the vehicle dynamic parameters 410, as shown in FIGS. 6, 7 and 8. In detail, the controller 400 includes a target distance calculating unit 420, a lateral offset compensating unit 430, a start-stop condition calculating unit 440 and a steering control weighting calculating unit 450. The vehicle dynamic parameters 410 include a vehicle speed, an acceleration, a yaw rate, a present steering angle and a driving torque. Firstly, the target distance calculating unit 420 calculates the vehicle dynamic parameters 410 of the vehicle 110 (e.g., the vehicle speed or the present steering angle) and a target time period $T_F$ to generate the target distance D. The target distance D is equal to the vehicle speed multiplied by the target time period $T_F$. The target time period $T_F$ must be greater than a delay time of the system. For example, the delay time of the system may be a delay time interval of image processing of a camera or a delay time interval between the start of sending a control command and an actual reaction corresponding to the control command. The faster the vehicle speed is, the larger the target distance D is. However, if the present steering angle of a steering wheel of the vehicle 110 is large, the system reduces target time period $T_F$ and the target distance D. The target distance D can be one or more limiting ranges, or one or multiple values. Secondly, the target distance D is transmitted from the target distance calculating unit 420 to the image processing device 300. The coordinate data $(x_i, y_i)$ of the lane markers 310 and the target distance D are calculated by the lane marker weighting adjusting unit 330 of the image processing device 300 to generate the target weighting $w_{image}(x_i)$ according to the above-mentioned equation (1) or (2). After that, the curve fitting unit 340 of the image processing device 300 multiplies the coordinate data $(x_i, y_i)$ of each of the lane markers 310 with the target weighting $w_{image}(x_i)$, and then uses a weighted least squares method to generate the lane fitting curve y. Hence, the vehicle lateral control system 100 of the present disclosure may generate the precise lane fitting curve y according to the target distance D and the target weighting $w_{image}(x_i)$ for smoothly adjusting a steering control force produced by the steering device 500, thereby allowing the steering control force to be smoothly switched between a driver and the system and enhancing the safety. Thirdly, the lateral offset compensating unit 430 is signally connected to the target distance calculating unit 420, the curve fitting unit 340 and the steering device 500. The lateral offset compensating unit 430 receives the lane fitting curve y from the curve fitting unit 340 and the target distance D from the target distance calculating unit 420. The lateral offset compensating unit 430 generates an expected steering angle θ according to the lane fitting curve y within the target distance D. The expected steering angle θ is transmitted from the lateral offset compensating unit 430 to the steering device 500. Furthermore, the start-stop condition calculating unit 440 is signally connected to the curve fitting unit 340 and the steering device 500. The start-stop condition calculating unit 440 receives the vehicle dynamic parameters 410 and the lane fitting curve y from the curve fitting unit 340. The start-stop condition calculating unit 440 generates a start-stop signal 442 according to the vehicle dynamic parameters 410 and the lane fitting curve y. The start-stop signal 442 is transmitted from the start-stop condition calculating unit 440 to the steering device 500 for determining that the steering device 500 is in a start state (i.e., in a turn-on state and controlled by the system) or in a stopped state (i.e., in a turn-off state and controlled by the driver). In addition, the steering control weighting calculating unit 450 is signally connected to the curve fitting unit 340 and the steering device 500. The steering control weighting calculating unit 450 receives the vehicle dynamic parameters 410 and the lane fitting curve y from the curve fitting unit 340. The steering control weighting calculating unit 450 generates the steering control weighting $W_R$ according to the vehicle dynamic parameters 410 and the lane fitting curve y. The steering control weighting $W_R$ is transmitted from the steering control weighting calculating unit 450 to the steering device 500.

For example, in a first embodiment of the present disclosure, the steering control weighting $W_R$ of the controller 400 is equal to a lateral offset weighting value W1, as shown in FIGS. 6 and 7. The vehicle 110 is spaced from the lane fitting curve y by a lateral offset distance y_offset, and the lateral offset weighting value W1 is increased according to an increase of the lateral offset distance y_offset. In other words, when the system predicts that the vehicle 110 is far from the lane fitting curve y (i.e., the lateral offset distance y_offset is small), the steering control weighting calculating unit 450 applies the smaller steering control weighting $W_R$ to the steering device 500 (i.e., the lateral offset weighting value W1 is small), so that the driver can manually control the steering device 500. On the contrary, when the system predicts that the vehicle 110 is close to the lane fitting curve y (i.e., the lateral offset distance y_offset is large), the steering control weighting calculating unit 450 applies the larger steering control weighting $W_R$ to the steering device 500 (i.e., the lateral offset weighting value W1 is large), so that the system can automatically control the steering device 500 and return the vehicle 110 to a center of the lane. Moreover, if the driver is willing to leave the lane, the start-stop condition calculating unit 440 generates the start-stop signal 442 being 0 according to the driving torque of the vehicle dynamic parameters 410 and the lane fitting curve y. The start-stop signal 442 being 0 represents that the steering device 500 is in the stopped state (i.e., in the turn-off state and controlled by the driver). On the contrary, if the driver is not willing to leave the lane, the start-stop condition calculating unit 440 generates the start-stop signal 442 being 1 according to the driving torque of the vehicle dynamic parameters 410 and the lane fitting curve y. The start-stop signal 442 being 1 represents that the steering device 500 is in the start state (i.e., in the turn-on state and controlled by the system).

In a second embodiment of the present disclosure, the steering control weighting $W_R$ of the controller 400 is equal to an estimated lane crossing weighting value W2, and the controller 400 generates an estimated lane crossing time T according to the vehicle speed, the acceleration and the yaw rate of the vehicle 110, as shown in FIGS. 6 and 8. The estimated lane crossing time T represents a time interval in which the vehicle 110 is moved from a current position to the lane fitting curve y. When the estimated lane crossing time T is equal to or smaller than a predetermined time $T_1$, the estimated lane crossing weighting value W2 is equal to 1. When the estimated lane crossing time T is greater than the predetermined time $T_1$, the estimated lane crossing weighting value W2 is decreased according to an increase of the estimated lane crossing time T. In other words, when the system predicts that the vehicle 110 is crossing to the lane fitting curve y in a short time period (i.e., the estimated lane crossing time T is small), the steering control weighting calculating unit 450 applies the larger steering control weighting $W_R$ to the steering device 500 (i.e., the estimated lane crossing weighting value W2 is large), so that the system can automatically control the steering device 500. On the other hand, when the system predicts that the vehicle 110 is crossing to the lane fitting curve y after a predetermined time period (i.e., the estimated lane crossing time T is large), the steering control weighting calculating unit 450 applies the smaller steering control weighting $W_R$ to the steering device 500 (i.e., the estimated lane crossing weighting value W2 is small), so that the system returns control back to the driver, and the driver can manually control the steering device 500.

In a third embodiment of the present disclosure, the steering control weighting $W_R$ of the controller 400 is determined by a maximum value of a lateral offset weighting value W1 and an estimated lane crossing weighting value W2, as shown in FIGS. 6, 7 and 8. In other words, the steering control weighting $W_R$ is equal to max(W1, W2). The steering control weighting $W_R$ is an interaction between the lateral offset weighting value W1 and the estimated lane crossing weighting value W2. The system considers the lateral offset distance y_offset (corresponding to the lateral offset weighting value W1) and the estimated lane crossing time T (corresponding to the estimated lane crossing weighting value W2) at the same time. When either condition is met, the steering control weighting $W_R$ is correspondingly changed. In addition, the lateral offset weighting value W1 and the vehicle speed are independent, i.e., the lateral offset weighting value W1 is not changed with the vehicle speed, as shown in FIG. 7. The estimated lane crossing weighting value W2 is related to the vehicle speed, the acceleration and the yaw rate of the vehicle 110. Accordingly, the present disclosure takes into consideration both the lateral offset weighting value W1 and the estimated lane crossing weighting value W2 to smoothly adjust the steering control force produced by the steering device 500, thus allowing the steering control force to be smoothly switched between the driver and the system.

In a fourth embodiment of the present disclosure, the steering control weighting $W_R$ of the controller 400 includes a lateral offset weighting value W1, a first percentage value e, an estimated lane crossing weighting value W2 and a second percentage value f, as shown in FIGS. 6, 7 and 8. The steering control weighting $W_R$ is equal to the lateral offset weighting value W1 multiplied by the first percentage value e minus the estimated lane crossing weighting value W2 multiplied by the second percentage value f. The first percentage value e plus the second percentage value f is equal to 100% (i.e., $W_R = W1 \times e + W2 \times f$, and $f = 1 - e$). The first percentage value e and the second percentage value f may be changeable according to the requirement of the driver. Hence, the vehicle lateral control system 100 of the present disclosure takes into consideration both the lateral offset weighting value W1 and the estimated lane crossing weighting value W2 to smoothly adjust the steering control force produced by the steering device 500, thus allowing the steering control force to be smoothly switched between the driver and the system. Moreover, the steering control weighting $W_R$ can be flexibly adjusted based on the requirement of the driver so as to enhance safety and significantly reduce a sudden steering control force and an uncomfortable feeling of the driver.

The steering device 500 is signally connected to the controller 400 and disposed on the vehicle 110. The steering device 500 is configured to control a turning direction of the vehicle 110 according to the steering control weighting $W_R$. In detail, the steering device 500 includes an angle controlling unit 510, a speed controlling unit 520, a current weighting calculating unit 530, a steering control force deciding unit 540, a current control mechanism 550, a driving mechanism 560 and a steering mechanism 570. The angle controlling unit 510 is signally connected to the speed controlling unit 520 and the lateral offset compensating unit 430. The angle controlling unit 510 receives the expected steering angle θ of the lateral offset compensating unit 430. The angle controlling unit 510 and the speed controlling unit 520 is used to generate a current command 522 for steering according to the expected steering angle θ. Additionally, the current weighting calculating unit 530 is signally connected to the speed controlling unit 520 and the steering control weighting calculating unit 450. The current weighting calculating unit 530 multiplies the steering control weighting $W_R$ by the current command 552 to generate a current weighting parameter. The steering control force deciding unit 540 is signally connected to the current weighting calculating unit 530 and receives the current weighting parameter and an electric power steering parameter EPS_i which is controlled by the driver. The steering control force deciding unit 540 combined with the current control mechanism 550 determines a driving current 552 applied to the driving mechanism 560 according to the electric power steering parameter EPS_i and the current weighting parameter, thereby adjusting the steering control force produced by an electric power steering unit (EPS) disposed on the vehicle 110. In addition, the current control mechanism 550 is signally connected the steering control force deciding unit 540 and is configured to apply the driving current 552. The driving current 552 is adjusted by the current control mechanism 550 according to the steering control weighting $W_R$. The driving current 552 is increased according to an increase of the steering control weighting $W_R$, and the driving current 552 is decreased according to a decrease of the steering control weighting $W_R$. Moreover, the driving mechanism 560 is electrically connected to the current control mechanism 550 and controlled by the driving current 552. In one embodiment, the driving mechanism 560 may be an electric motor. The steering mechanism 570 is driven by the driving mechanism 560. The steering mechanism 570 is configured to control the turning direction of the vehicle 110 according to the driving current 552. In one embodiment, the steering mechanism 570 may be the steering wheel, a reducer, a gear, a propeller shaft, a tire, etc. Therefore, the steering device 500 of the present disclosure having the electric power steering unit can determine the driving current 552 applied to the driving mechanism 560 according to the electric power steering parameter EPS_i and the current weighting parameter, thus adjusting the steering control force produced by the electric power steering unit and increasing the smoothness of switching the steering control force.

Figure 9:
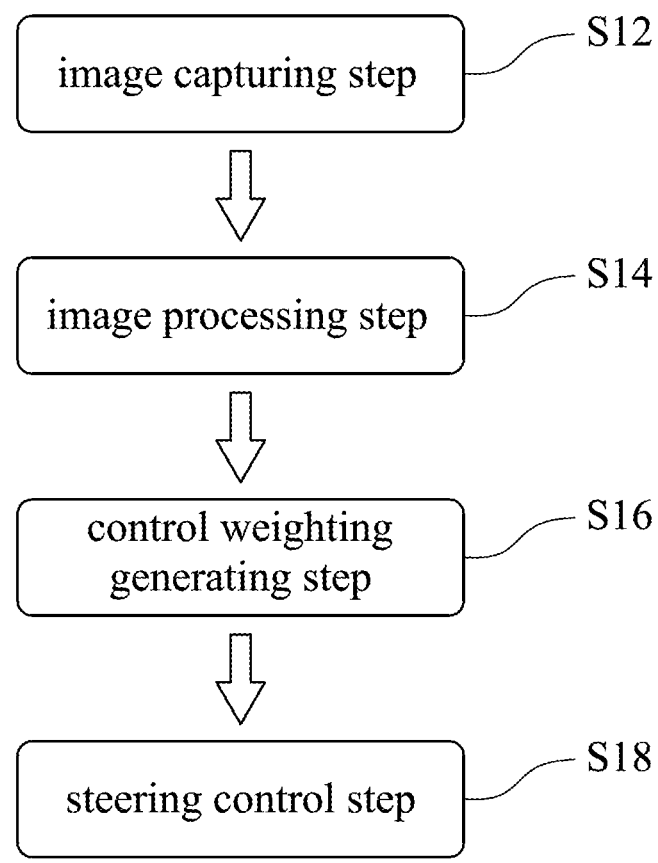
FIG. 9 shows a flow chart of a vehicle lateral control method having a lane model with modulation weighting for controlling a vehicle according to one embodiment of the present disclosure.

FIG. 9 shows a flow chart of a vehicle lateral control method 600 having a lane model with modulation weighting for controlling a vehicle according to one embodiment of the present disclosure. The vehicle lateral control method 600 provides an image capturing step S12, an image processing step S14, a control weighting generating step S16 and a steering control step S18.

The image capturing step S12 is for capturing a front image of the vehicle 110 to generate a front image dataset 210 by a camera 200.

The image processing step S14 is for receiving the front image dataset 210 and analyzing the front image dataset 210 by the image processing device 300 to obtain a plurality of lane markers 310. The image processing device 300 establishes a lane fitting curve y according to the lane markers 310 and a target weighting $w_{image}(x_i)$. The target weighting $w_{image}(x_i)$ satisfies the above-mentioned equation (1) or (2). The lane fitting curve y satisfies the above-mentioned equations (3)-(6).

The control weighting generating step S16 is for generating a steering control weighting $W_R$ according to the lane fitting curve y and a plurality of vehicle dynamic parameters 410 by a controller 400. The controller 400 has the vehicle dynamic parameters 410 and a target distance D. The target weighting $w_{image}(x_i)$ is changeable according to the target distance D, as shown in FIGS. 5A and 5B. In the control weighting generating step S16, the target weighting $w_{image}(x_i)$ within the target distance D is greater than the target weighting $w_{image}(x_i)$ beyond the target distance D, as shown in FIG. 5A. Moreover, in FIGS. 7 and 8, the steering control weighting $W_R$ may be related to the lateral offset weighting value W1, the estimated lane crossing weighting value W2 or both. There are four embodiments of the steering control weighting $W_R$ of the present disclosure. In the first embodiment, the steering control weighting $W_R$ of the controller 400 is equal to the lateral offset weighting value W1. The vehicle 110 is spaced from the lane fitting curve y by a lateral offset distance y_offset, and the lateral offset weighting value W1 is increased according to an increase of the lateral offset distance y_offset, as shown in FIG. 7. In the second embodiment, the steering control weighting $W_R$ of the controller 400 is equal to the estimated lane crossing weighting value W2, and the controller 400 generates an estimated lane crossing time T according to the vehicle speed, the acceleration and the yaw rate of the vehicle 110. When the estimated lane crossing time T is equal to or smaller than a predetermined time $T_1$, the estimated lane crossing weighting value W2 is equal to 1. When the estimated lane crossing time T is greater than the predetermined time $T_1$, the estimated lane crossing weighting value W2 is decreased according to an increase of the estimated lane crossing time T. In addition, in the third embodiment, the steering control weighting $W_R$ of the controller 400 is determined by a maximum value of the lateral offset weighting value W1 and the estimated lane crossing weighting value W2. In the fourth embodiment, the steering control weighting $W_R$ of the controller 400 includes the lateral offset weighting value W1, a first percentage value e, the estimated lane crossing weighting value W2 and a second percentage value f. The steering control weighting $W_R$ is equal to the lateral offset weighting value W1 multiplied by the first percentage value e minus the estimated lane crossing weighting value W2 multiplied by the second percentage value f. The first percentage value e plus the second percentage value f is equal to 100%.

The steering control step S18 is for controlling a turning direction of the vehicle 110 according to the steering control weighting $W_R$ by a steering device 500. Accordingly, the vehicle lateral control method 600 of the present disclosure takes into consideration both the lateral offset weighting value W1 and the estimated lane crossing weighting value W2 to smoothly adjust the steering control force produced by the steering device 500, thus allowing the steering control force to be smoothly switched between the driver and the system. Moreover, the steering control weighting $W_R$ can be flexibly adjusted based on the requirement of the driver so as to enhance safety and significantly reduce the sudden steering control force and the uncomfortable feeling of the driver.

Figure 10:
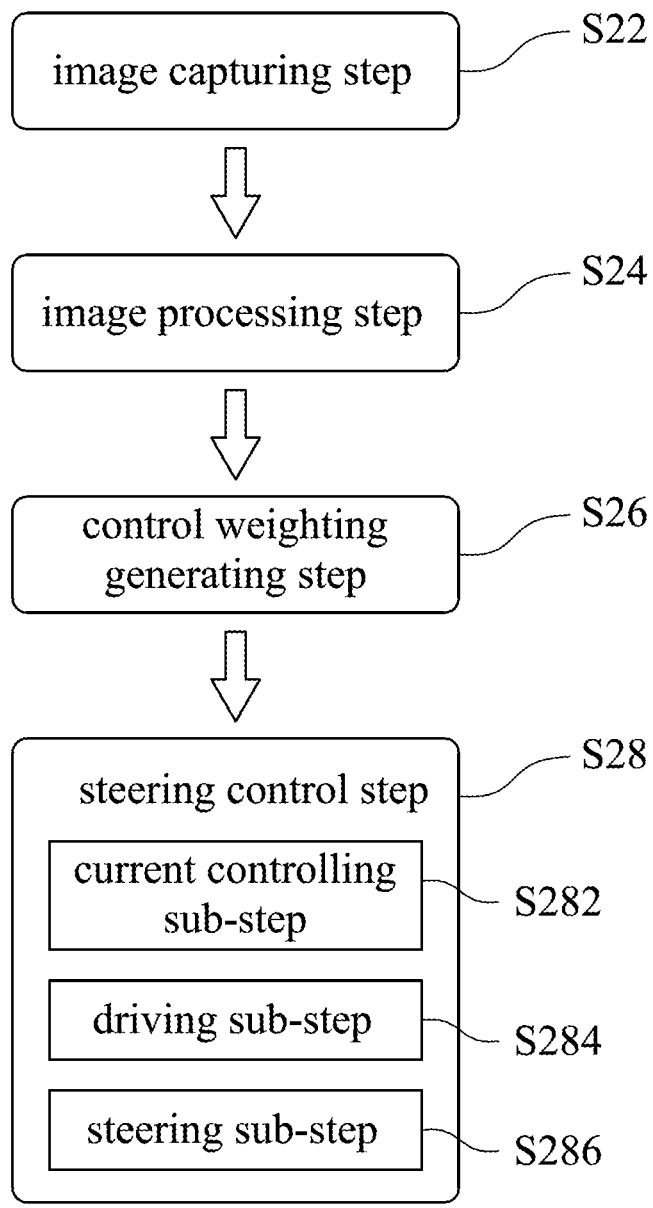
FIG. 10 shows a flow chart of a vehicle lateral control method having a lane model with modulation weighting for controlling a vehicle according to another embodiment of the present disclosure.

FIG. 10 shows a flow chart of a vehicle lateral control method 600a having a lane model with modulation weighting for controlling a vehicle 110 according to another embodiment of the present disclosure. The vehicle lateral control method 600a provides an image capturing step S22, an image processing step S24, a control weighting generating step S26 and a steering control step S28.

In FIG. 10, the detail of the image capturing step S22, an image processing step S24 and a control weighting generating step S26 is the same as the embodiments of FIG. 9, and will not be described again herein. In FIG. 10, the vehicle lateral control method 600a further includes the steering control step S28 having a current controlling sub-step S282, a driving sub-step S284 and a steering sub-step S286. The current controlling sub-step S282 is for adjusting a driving current 552 by a current control mechanism 550 according to the steering control weighting $W_R$. The driving sub-step S284 is for controlling a driving mechanism 560 by the driving current 552. The steering sub-step S286 is for driving a steering mechanism 570 by the driving mechanism 560, and the steering mechanism 570 is configured to control the turning direction of the vehicle 110 according to the driving current 552. Moreover, the driving current 552 is increased according to an increase of the steering control weighting $W_R$, and the driving current 552 is decreased according to a decrease of the steering control weighting $W_R$. Therefore, the driving current 552 of the present disclosure can be adaptively adjusted according to the steering control weighting $W_R$ so as to allow the steering control force to be smoothly switched and enhance safety and comfort of the switching process.

According to the aforementioned embodiments and examples, the advantages of the present disclosure are described as follows.

1. The image processing device of the present disclosure may be associated with the controller to adjust the weighting of the lane markers within the target distance, thereby precisely performing the computation of the lane model. In addition, the effectiveness of the vehicle lateral control system and the accuracy of the lane fitting curve are greatly enhanced.

2. The vehicle lateral control system and the vehicle lateral control method of present disclosure take into consideration both the lateral offset weighting value and the estimated lane crossing weighting value to smoothly adjust the steering control force produced by the steering device, thus allowing the steering control force to be smoothly switched between the driver and the system. Moreover, the steering control weighting can be flexibly adjusted based on the requirement of the driver so as to enhance safety and significantly reduce the sudden steering control force and the uncomfortable feeling of the driver.

3. The driving current of the present disclosure can be adaptively adjusted according to the steering control weighting so as to allow the steering control force to be smoothly switched and enhance safety and comfort of the switching process.

4. The vehicle lateral control system and the vehicle lateral control method of present disclosure utilize the target weighting combined with the steering control weighting to allow the steering control force to be smoothly switched, so that conventional problems of generating the sudden steering control force and the uncomfortable feeling of the driver during the switching process can be overcome.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle lateral control system having a lane model with modulation weighting for controlling a vehicle, the vehicle lateral control system comprising:
    a camera disposed on the vehicle and faced toward a front of the vehicle, wherein the camera is configured to capture a front image of the vehicle to generate a front image dataset;
    an image processing device signally connected to the camera and receives the front image dataset, wherein the front image dataset is analyzed by the image processing device to obtain a plurality of lane markers, and the image processing device establishes a lane fitting curve according to the lane markers and a target weighting;
    a controller signally connected to the image processing device and having a plurality of vehicle dynamic parameters and a target distance, wherein the target weighting is changeable according to the target distance, and the controller generates a steering control weighting according to the lane fitting curve and the vehicle dynamic parameters; and
    a steering device signally connected to the controller and disposed on the vehicle, wherein the steering device is configured to control a turning direction of the vehicle according to the steering control weighting;
    wherein the target weighting within the target distance is greater than the target weighting beyond the target distance.

2. The vehicle lateral control system of claim 1, wherein the steering control weighting of the controller is equal to a lateral offset weighting value, the vehicle is spaced from the lane fitting curve by a lateral offset distance, and the lateral offset weighting value is increased according to an increase of the lateral offset distance.

3. The vehicle lateral control system of claim 1, wherein the steering control weighting of the controller is equal to an estimated lane crossing weighting value, and the controller generates an estimated lane crossing time according to a vehicle speed, an acceleration and a yaw rate of the vehicle;
    wherein when the estimated lane crossing time is equal to or smaller than a predetermined time, the estimated lane crossing weighting value is equal to 1;
    wherein when the estimated lane crossing time is greater than the predetermined time, the estimated lane crossing weighting value is decreased according to an increase of the estimated lane crossing time.

4. The vehicle lateral control system of claim 1, wherein the steering control weighting of the controller is determined by a maximum value of a lateral offset weighting value and an estimated lane crossing weighting value.

5. The vehicle lateral control system of claim 1, wherein the steering control weighting of the controller comprises a lateral offset weighting value, a first percentage value, an estimated lane crossing weighting value and a second percentage value, the steering control weighting is equal to the lateral offset weighting value multiplied by the first percentage value minus the estimated lane crossing weighting value multiplied by the second percentage value, and the first percentage value plus the second percentage value is equal to 100%.

6. The vehicle lateral control system of claim 1, wherein the steering device comprises:
    a current control mechanism configured to apply a driving current, wherein the driving current is adjusted by the current control mechanism according to the steering control weighting;
    a driving mechanism electrically connected to the current control mechanism and controlled by the driving current; and
    a steering mechanism driven by the driving mechanism, wherein the steering mechanism is configured to control the turning direction of the vehicle according to the driving current.

7. The vehicle lateral control system of claim 6, wherein the driving current is increased according to an increase of the steering control weighting, and the driving current is decreased according to a decrease of the steering control weighting.

8. The vehicle lateral control system of claim 1, wherein the vehicle dynamic parameters comprise a vehicle speed, an acceleration, a yaw rate, a present steering angle and a driving torque.

9. A vehicle lateral control method having a lane model with modulation weighting for controlling a vehicle, the vehicle lateral control method comprising:
    providing an image capturing step, wherein the image capturing step is for capturing a front image of the vehicle to generate a front image dataset by a camera;
    providing an image processing step, wherein the image processing step is for receiving the front image dataset and analyzing the front image dataset by the image processing device to obtain a plurality of lane markers, and the image processing device establishes a lane fitting curve according to the lane markers and a target weighting;
    providing a control weighting generating step, wherein the control weighting generating step is for generating a steering control weighting according to the lane fitting curve and a plurality of vehicle dynamic parameters by a controller, the controller has the vehicle dynamic parameters and a target distance, and the target weighting is changeable according to the target distance; and
    providing a steering control step, wherein the steering control step is for controlling a turning direction of the vehicle according to the steering control weighting by a steering device;
    wherein in the control weighting generating step, the target weighting within the target distance is greater than the target weighting beyond the target distance.

10. The vehicle lateral control method of claim 9, wherein,
in the control weighting generating step, the steering control weighting of the controller is equal to a lateral offset weighting value, the vehicle is spaced from the lane fitting curve by a lateral offset distance, and the lateral offset weighting value is increased according to an increase of the lateral offset distance.

11. The vehicle lateral control method of claim 9, wherein,
in the control weighting generating step, the steering control weighting of the controller is equal to an estimated lane crossing weighting value, and the controller generates an estimated lane crossing time according to a vehicle speed, an acceleration and a yaw rate of the vehicle;
wherein when the estimated lane crossing time is equal to or smaller than a predetermined time, the estimated lane crossing weighting value is equal to 1;
wherein when the estimated lane crossing time is greater than the predetermined time, the estimated lane crossing weighting value is decreased according to an increase of the estimated lane crossing time.

12. The vehicle lateral control method of claim 9, wherein,
in the control weighting generating step, the steering control weighting of the controller is determined by a maximum value of a lateral offset weighting value and an estimated lane crossing weighting value.

13. The vehicle lateral control method of claim 9, wherein,
in the control weighting generating step, the steering control weighting of the controller comprises a lateral offset weighting value, a first percentage value, an estimated lane crossing weighting value and a second percentage value, the steering control weighting is equal to the lateral offset weighting value multiplied by the first percentage value minus the estimated lane crossing weighting value multiplied by the second percentage value, and the first percentage value plus the second percentage value is equal to 100%.

14. The vehicle lateral control method of claim 9, wherein the steering control step comprises:
providing a current controlling sub-step, wherein the current controlling sub-step is for adjusting a driving current by a current control mechanism according to the steering control weighting;
providing a driving sub-step, wherein the driving sub-step is for controlling a driving mechanism by the driving current; and
providing a steering sub-step, wherein the steering sub-step is for driving a steering mechanism by the driving mechanism, and the steering mechanism is configured to control the turning direction of the vehicle according to the driving current.

15. The vehicle lateral control method of claim 14, wherein,
in the steering control step, the driving current is increased according to an increase of the steering control weighting, and the driving current is decreased according to a decrease of the steering control weighting.

* * * * *